(12) United States Patent
Shigematsu et al.

(10) Patent No.: US 10,074,830 B2
(45) Date of Patent: Sep. 11, 2018

(54) BATTERY HOUSING STRUCTURE

(71) Applicant: MURATA MANUFACTURING CO., LTD., Nagaokakyo-Shi, Kyoto-fu (JP)

(72) Inventors: Satoshi Shigematsu, Nagaokakyo (JP); Kazuhiro Yamada, Nagaokakyo (JP); Masanori Endo, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 489 days.

(21) Appl. No.: 14/225,871

(22) Filed: Mar. 26, 2014

(65) Prior Publication Data

US 2014/0212744 A1   Jul. 31, 2014

Related U.S. Application Data

(63) Continuation of application No. PCT/JP2012/074463, filed on Sep. 25, 2012.

(30) Foreign Application Priority Data

Sep. 30, 2011   (JP) .................................. 2011-216244

(51) Int. Cl.
  *H01M 2/02*   (2006.01)
  *H01M 10/04*  (2006.01)
  *H01M 2/04*   (2006.01)
  *H01M 2/22*   (2006.01)
  *H01M 2/26*   (2006.01)
  (Continued)

(52) U.S. Cl.
  CPC ....... *H01M 2/0202* (2013.01); *H01M 2/0215* (2013.01); *H01M 2/0404* (2013.01); *H01M 10/0436* (2013.01); *H01M 10/0463* (2013.01); *H01M 2/22* (2013.01); *H01M 2/26* (2013.01); *H01M 10/052* (2013.01); *H01M 10/0585* (2013.01)

(58) Field of Classification Search
  None
  See application file for complete search history.

(56) References Cited

U.S. PATENT DOCUMENTS

2004/0038122 A1*  2/2004  Hisamitsu ........... H01M 2/0212
                                                  429/120
2005/0037258 A1   2/2005  Itoh et al.
2007/0253141 A1   11/2007 Kato et al.
(Continued)

FOREIGN PATENT DOCUMENTS

CN   101142643 A   3/2008
JP   2005-039256  2/2005
(Continued)

OTHER PUBLICATIONS

PCT/JP2012/074463 Written Opinion dated Dec. 13, 2012.
PCT/JP2012/074463 ISR dated Dec. 13, 2012.

*Primary Examiner* — Barbara Lee Gilliam
*Assistant Examiner* — Adam A Arciero
(74) *Attorney, Agent, or Firm* — Arent Fox LLP

(57) ABSTRACT

A battery housing structure for housing a battery body that includes a positive electrode layer, a solid electrolyte layer, and a negative electrode layer. A housing member houses the battery body and includes conductors connected to the positive electrode layer and the negative electrode layer, respectively. An interposition member is interposed between the battery body and the housing member.

17 Claims, 11 Drawing Sheets

(51) Int. Cl.
*H01M 10/052* (2010.01)
*H01M 10/0585* (2010.01)

(56) References Cited

U.S. PATENT DOCUMENTS

2009/0011330 A1   1/2009   Onodera et al.
2009/0023059 A1   1/2009   Kinoshita et al.

FOREIGN PATENT DOCUMENTS

| | | |
|---|---|---|
| JP | 2007-242593 | 9/2007 |
| JP | 2010-161244 A | 3/2008 |
| JP | 2010-118159 A | 5/2010 |
| JP | 2010-161244 A | 7/2010 |
| WO | WO 2012/141231 | 10/2012 |

\* cited by examiner

BATTERY HOUSING STRUCTURE

CROSS REFERENCE TO RELATED APPLICATIONS

The present application is a continuation of International application No. PCT/JP2012/074463, filed Sep. 25, 2012, which claims priority to Japanese Patent Application No. 2011-216244, filed Sep. 30, 2011, the entire contents of each of which are incorporated herein by reference.

FIELD OF THE INVENTION

The present invention generally relates to a battery housing structure, and particularly relates to a battery housing structure housing a battery body of a solid battery including a positive electrode layer, a solid electrolyte layer, and a negative electrode layer which are laminated sequentially.

BACKGROUND OF THE INVENTION

A lithium ion secondary battery and the like using a non-aqueous electrolyte solution are used in a small electronic device power supply, a memory backup auxiliary power supply, and the like. However, the above-described lithium ion secondary battery has a problem that the electrolyte solution could be leaked. Therefore, in the case where the above-described lithium ion secondary battery is used in the memory backup auxiliary power supply and the like, a peripheral electronic circuit could get wet by the leaked electrolyte, which causes problems such as a defect or a malfunction of an electronic circuit. In order to avoid these problems, the lithium ion secondary battery and the electronic circuit have been conventionally mounted in different positions.

However, recently, as the electronic device has been required to be further miniaturized, to mount the battery and the electronic circuit in the different positions becomes a factor which prevents the miniaturization. Thus, recently, a battery which can be mounted on a substrate has been devised.

For example, Japanese Patent Unexamined Publication No. 2010-118159 (hereinafter, referred to as patent document 1) discloses a battery which can be mounted on a substrate together with an electronic circuit component.

According to this battery, a battery laminate having a positive electrode layer, a negative electrode layer, and a solid electrolyte layer arranged therebetween is housed in a sealing case (outer package) which can be mounted on the substrate. In order to take out a power from the battery laminate, a laminate connection electrode part is provided in a power collector formed so as to be connected to each electrode layer in the battery laminate. In addition, a case connection electrode part including an external terminal part so as to correspond to each electrode layer is provided in the sealing case. Furthermore, the laminate connection electrode part and the case connection electrode part are connected through wire-bonding with a lead in the sealing case.

Patent document 1: Japanese Patent Unexamined Publication No. 2010-118159

SUMMARY OF THE INVENTION

However, according to the configuration of the battery disclosed in the patent document 1, when the battery laminate (battery body) is displaced in the sealing case due to a vibration or the like at the time of production or transportation, an electric connection between the laminate connection electrode part and the case connection electrode part cannot be preferably assured.

Thus, an object of the present invention is to provide a configuration of a mount type battery housing structure capable of preferably assuring an electric connection with an electrode layer of a battery body, and capable of housing the battery body of a solid battery.

A battery housing structure according to the present invention includes a battery body including a positive electrode layer, a solid electrolyte layer, and a negative electrode layer, a housing member housing the battery body, and including conductors connected to the positive electrode layer and the negative electrode layer, respectively, and an interposition member interposed between the battery body and the housing member.

According to the battery housing structure in the present invention, since the interposition member is provided between the battery body and the housing member, the battery body can be prevented from being displaced in the housing member even when a vibration, impact or the like is applied to the battery housing structure. As a result, the electric connection between the electrode layer of the battery body and the conductor in the housing member can be preferably assured, and reliability can be enhanced.

Furthermore, according to the battery housing structure in the present invention, the battery bodies having various shapes and sizes can be positioned in the same housing member by changing a shape, a size, or the like of the interposition member, by using a plurality of interposition members, or the like.

Herein, according to the battery housing structure in the present invention, since the housing member which is larger than the battery body is used, the battery body can be easily housed in the housing member. Furthermore, since air exists between an outer circumference of the battery body and an inner circumference of the housing member, the insulating property can be assured, so that a heat releasing property can be enhanced.

The interposition member of the battery housing structure in the present invention may have an insulating property, or may have a conductive property.

The interposition member may be fixed to the housing member. In this case, the battery body can be effectively prevented from being displaced in the housing member.

The interposition member of the battery housing structure in the present invention is preferably arranged so as to surround an outer circumference of the battery body. In this case, the interposition member preferably includes a ring-shaped member surrounding the outer circumference of the battery body.

The interposition member of the battery housing structure in the present invention may be configured to include a plurality of members opposed to each other across the battery body.

The interposition member of the battery housing structure in the present invention may be configured to include a part supporting at least one part of the outer periphery of the battery body. In this case, the battery body can be fixedly positioned in the housing member.

In the above case, it is preferable that the interposition member has a recessed part, and the outer periphery of the battery body has a projection part having a shape fitting in the recessed part.

The interposition member of the battery housing structure in the present invention preferably includes an insulating base material having a surface on which the battery body is placed, and a lid member bonded to the insulating base material so as to cover the battery body placed on the surface of the insulating base material.

In the above case, the battery housing structure in the present invention may further include a conductive spacer arranged between the lid member and at least one of the positive electrode layer and the negative electrode layer. Alternatively, the battery housing structure in the present invention may further include a conductive spacer arranged between at least one of the positive electrode layer and the negative electrode layer, and the insulating base material. In this configuration, it is possible to prevent displacement and escaping of the conductive spacer caused by the displacement of the battery body in the housing member. As a result, it is possible to prevent an electric connection defect between the electrode layer of the battery body and the conductor in the housing member, so that reliability can be enhanced.

Furthermore, in the above case, the battery housing structure in the present invention may further include an insulating spacer arranged between the battery body and the lid member. In this case, the interposition member may be fixed to the insulating spacer.

Furthermore, in the above case, the interposition member may be arranged on a side of the insulating base material, or may be arranged on a side of the lid member. In addition, the interposition member may be fixed to the lid member.

In the case where the housing member of the battery housing structure in the present invention includes the insulating base material having the surface on which the battery body is placed, and the lid member bonded to the insulating base material so as to cover the battery body placed on the surface of the insulating base material, at least one of the insulating base material and the lid member preferably has a recessed part housing at least one part of the battery body.

In this case, it is preferable that the battery body has an outer surface, and the recessed part of at least one of the insulating base material and the lid member has a peripheral wall formed so as to surround at least one part of the outer surface of the battery body. Furthermore, the interposition member is preferably arranged between the peripheral wall and the battery body.

In the case where the housing member of the battery housing structure in the present invention includes the insulating base material having the surface on which the battery body is placed, and the lid member bonded to the insulating base material so as to cover the battery body placed on the surface of the insulating base material, the positive electrode layer and the negative electrode layer may be laminated in an opposed direction of the insulating base material and the lid member, or the positive electrode layer and the negative electrode layer may be laminated in an extending direction of the insulating base material.

In the case where the positive electrode layer and the negative electrode layer are laminated in the extending direction of the insulating base material, when the insulating base material is placed on a surface of a substrate, the positive electrode layer and the negative electrode layer can be arranged in an extending direction of the surface of the substrate. As a result, each surface of the positive electrode layer and the negative electrode layer can be opposed to the surface of the substrate. Therefore, each of the positive electrode layer and the negative electrode layer can be connected to an electronic circuit wiring or the like provided on the substrate, so that the battery body can be easily mounted on the substrate.

According to the present invention, it is possible to provide the mount type battery housing structure capable of preferably assuring the electric connection between the electrode layer of the solid battery and the conductor in the housing member, and capable of housing the battery body of the solid battery with high reliability.

DETAILED DESCRIPTION OF THE INVENTION

First, a configuration serving as a premise of the present invention will be described.

Figure 19A:
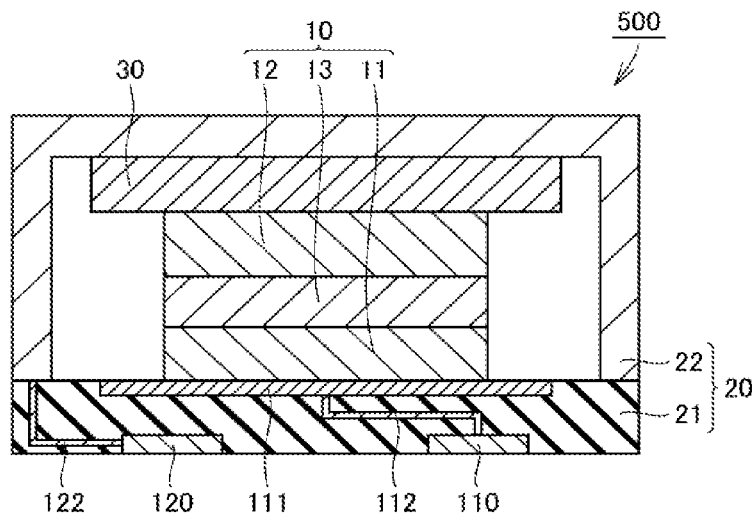
FIGS. 19(A) and 19(B) are vertical cross-sectional views showing a schematic cross-sectional surface of a battery housing structure as one comparison embodiment of the present invention.

As shown in FIG. 19(A), according to one comparison embodiment of the present invention, a surface mount type battery housing structure 500 is composed of a battery body 10, and a housing member 20 for housing the battery body 10. The battery body 10 includes a positive electrode layer 11, a negative electrode layer 12, and a solid electrolyte layer 13 sandwiched between the positive electrode layer 11 and the negative electrode layer 12. The housing member 20 is composed of an insulating base material 21 and a metal lid member 22. The insulating base material 21 has a surface on which the battery body 10 is placed. The metal lid member 22 is bonded to the insulating base material 21 so as to cover the battery body 10 placed on the surface of the insulating base material 21. The battery body 10 is formed such that the positive electrode layer 11, the solid electrolyte layer 13, and the negative electrode layer 12 are sequentially laminated in an opposed direction of the insulating base material 21 and the metal lid member 22. In addition, the metal lid member 22 has a recessed part for housing the battery body 10. A conductive spacer 30 is arranged between an inner face of the metal lid member 22 and an outer face of the negative electrode layer 12. A positive electrode layer connection terminal 111 is arranged on inner faces of the metal lid member 22 and the insulating base material 21. A positive electrode terminal 110 and a negative electrode terminal 120 are arranged on an outer face of the insulating base material 21. A positive electrode connector 112 and a negative electrode connector 122 are arranged inside the insulating base material 21 as electrode connectors to connect an inner face to the outer face of the insulating base material 21. The positive electrode layer 11 of the battery body 10 is connected to the positive electrode terminal 110 through the positive electrode layer connection terminal 111 and the positive electrode connector 112. The negative electrode layer 12 of the battery body 10 is connected to the negative electrode terminal 120 through the metal lid member 22 and the negative electrode connector 122.

Figure 19B:
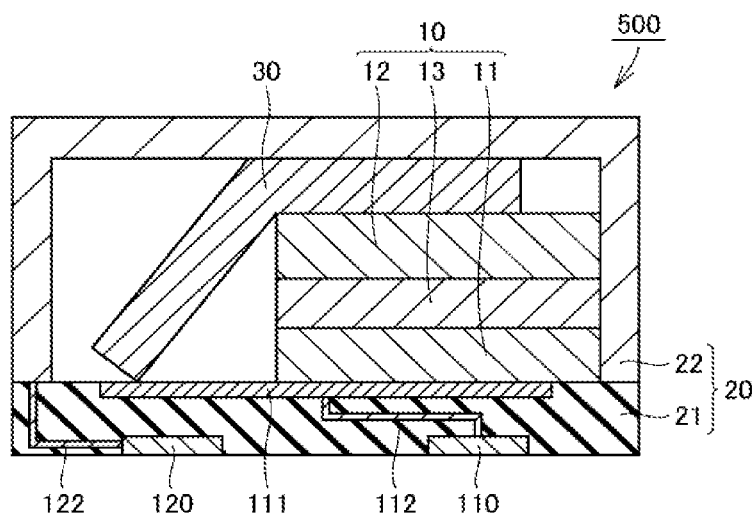

According to the battery housing structure 500 configured as described above, the battery body 10 is fixed between the insulating base material 21 and the metal lid member 22 with the conductive spacer 30 interposed therebetween. When a vibration, impact, or the like is applied to the battery housing structure 500, and the battery body 10 is displaced in the housing member 20, the conductive spacer 30 is displaced as shown in FIG. 19(B). As a result, an electric connection between the electrode layers (the positive electrode layer 11 and the negative electrode layer 12) of the battery body 10 and the conductors (the metal lid member 22 and the positive electrode layer connection terminal 111) in the housing member 20 cannot be preferably assured, so that an electric short circuit may be caused.

Figure 20A:
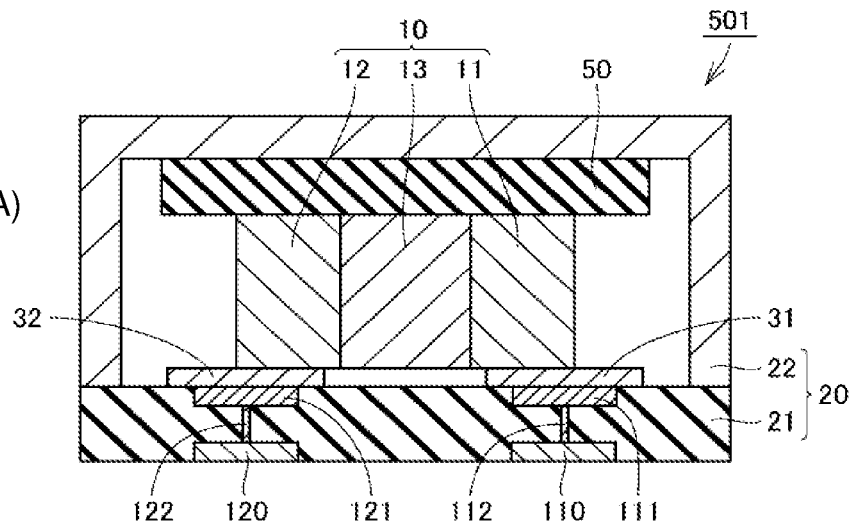
FIGS. 20(A) and 20(B) are vertical cross-sectional views showing a schematic cross-sectional surface of a battery housing structure as another comparison embodiment of the present invention.

In addition, as shown in FIG. 20(A), according to a surface mount type battery housing structure 501 in another comparison embodiment of the present invention, the battery body 10 is formed such that the positive electrode layer 11, the solid electrolyte layer 13, and the negative electrode layer 12 are sequentially laminated in an extending direction of the insulating base material 21. An insulating spacer 50 is arranged between the inner surface of the metal lid member 22 and the battery body 10. A conductive spacer 31 is arranged between the positive electrode layer connection terminal 111 arranged on the inner face of the insulating base material 21 and the positive electrode layer 11, and a conductive spacer 32 is arranged between a negative electrode connection terminal 121 arranged on the inner face of the insulating base material 21 and the negative electrode layer 12.

Figure 20B:
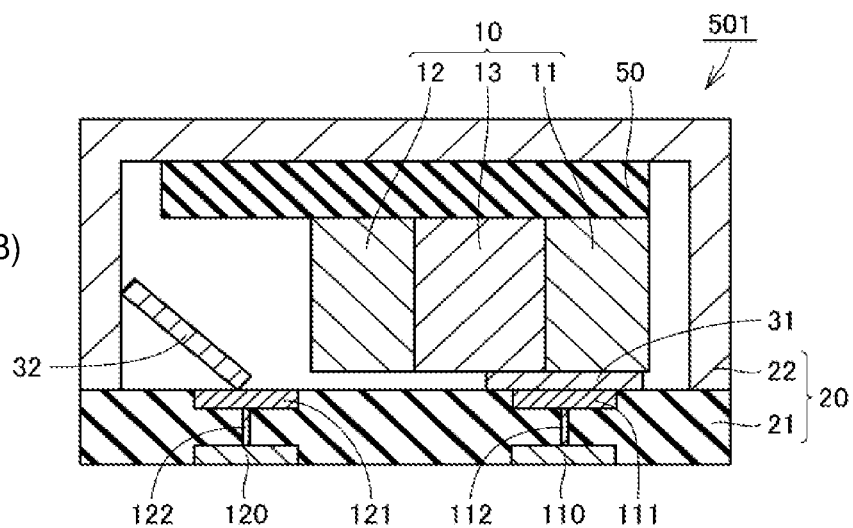

According to the battery housing structure 501 configured as described above, the battery body 10 is fixed between the insulating base material 21 and the metal lid member 22 with the insulating spacer 50 and the conductive spacers 31 and 32 interposed therebetween. When a vibration, impact, or the like is applied to the battery housing structure 501, and the battery body 10 is displaced in the housing member 20, the conductive spacer 32 comes off as shown in FIG. 20(B). As a result, an electric connection between the electrode layer (the negative electrode layer 12) of the battery body 10 and the conductor (the negative electrode layer connection terminal 121) in the housing member 20 cannot be preferably assured, so that a connection defect may be caused.

A battery housing structure of the present invention has been configured in order to solve the above problems.

Hereinafter, embodiments of the battery housing structures in the present invention will be described.

First Embodiment

Figure 1:
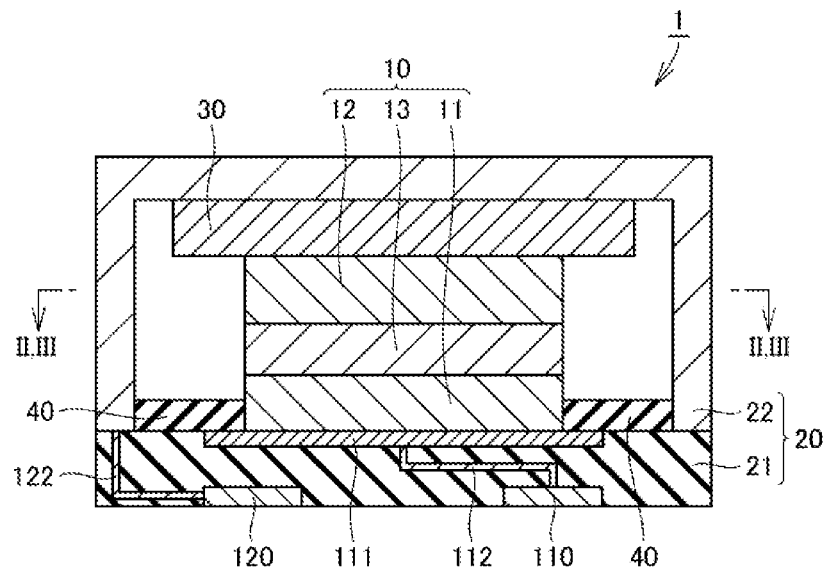
FIG. 1 is a vertical cross-sectional view showing a schematic cross-sectional surface of a battery housing structure as a first embodiment of the present invention.

As shown in FIG. 1, according to a first embodiment of the present invention, a surface mount type battery housing structure 1 is composed of the cuboid-shaped battery body 10, and the housing member 20 for housing the battery body 10.

An all-solid-state secondary battery, serving as the battery body 10, for example, includes the solid electrolyte layer 13 sandwiched between the positive electrode layer 11 and the negative electrode layer 12. The positive electrode layer 11 contains, for example, $Li_2FeS_2$ or $LiCoO_2$ as a positive electrode active material, and $Li_2S$—$P_2S_5$ series composition or $Li_3PS_4$ as a solid electrolyte. The negative electrode layer 12 contains, for example, graphite as a negative electrode active material, and $Li_2S$—$P_2S_5$ series composition or $Li_3PS_4$ as the solid electrolyte. The solid electrolyte layer 13 sandwiched between the positive electrode layer 11 and the negative electrode layer 12 is $Li_2S$—$P_2S_5$ series composition or $Li_3PS_4$. Furthermore, for example, a thickness of the positive electrode layer 11 is about 100 μm, a thickness of the negative electrode layer 12 is about 200 μm, and a thickness of the solid electrolyte layer 13 is about 300 μm.

The housing member 20 is composed of the insulating base material 21 and the metal lid member 22. The insulating base material 21 has the surface on which the battery body 10 is placed. The metal lid member 22 is bonded to the insulating base material 21 so as to cover the battery body 10 placed on the surface of the insulating base material 21. The insulating base material 21 has a plate shape, and the metal lid member 22 has the recessed part for housing the battery body 10. The battery body 10 is formed such that the positive electrode layer 11, the solid electrolyte layer 13, and the negative electrode layer 12 are sequentially laminated in the opposed direction of the insulating base material 21 and the metal lid member 22. The conductive spacer 30 composed of a carbon sheet, conductive polymer, or the like is arranged between the outer face of the negative electrode layer 12 of the battery body 10 and the inner face of the metal lid member 22 serving as one part of the housing member. The battery body 10 is arranged in the housing member 20 such that the outer face of the negative electrode layer 12 is connected to the inner surface of the metal lid member 22 through the conductive spacer 30.

The metal lid member 22 is bonded to an outer peripheral surface of the insulating base material 21 through a metalized layer (not shown) so as to cover the battery body 10 placed on the surface of the insulating base material 21. The metalized layer is formed by, for example, printing/coating a metal paste containing a metal such as tungsten (W) as its major component and firing it. The insulating base material 21 is composed of ceramics such as alumina. The metal lid member 22 is composed of metal such as aluminum (Al) or copper (Cu), or alloy such as iron (Fe)-nickel (Ni)-covert (Co) alloy.

Furthermore, the insulating base material 21 is composed of ceramics in this embodiment, but it may be composed of insulating material such as synthetic resin which can resist heating temperature in a reflow furnace. In this case, the insulating base material 21 is preferably composed of synthetic resin whose heat distortion temperature is 270° C. or more.

The positive electrode connector 112 and the negative electrode connector 122 serving as the electrode connectors to connect the inner face to the outer face of the insulating base material 21 are arranged inside the insulating base material 21. The positive electrode connector 112 and the negative electrode connector 122 are formed in a following manner, for example. First, a print pattern serving as a conductor layer of each of the positive electrode connector 112 and the negative electrode connector 122 is formed in a ceramic green sheet as the insulating base material 21 in such a manner that a metal paste containing a metal such as tungsten (W) as its major component is printed/applied onto a surface of the green sheet, or printed/applied into a hole formed in the green sheet. Then, the green sheets having the above print patterns are laminated and fired, whereby the insulating base material 21 having the positive electrode connector 112 and the negative electrode connector 122 therein is produced. Herein, a method of forming the electrode connector is not limited.

The positive electrode layer connection terminal 111 is arranged on the inner faces of the metal lid member 22 and the insulating base material 21. The positive electrode terminal 110 and the negative electrode terminal 120 are arranged on the outer face of the insulating base material 21. The positive electrode connector 112 and the negative electrode connector 122 serving as the electrode connectors to connect the inner face to the outer face of the insulating base material 21 are arranged inside the insulating base material 21. The positive electrode layer 11 of the battery body 10 is connected to the positive electrode terminal 110 through the positive electrode layer connection terminal 111 and the positive electrode connector 112. The negative electrode layer 12 of the battery body 10 is connected to the negative electrode terminal 120 through the metal lid member 22 and the negative electrode connector 122. The positive electrode layer connection terminal 111, the positive electrode terminal 110, and the negative electrode terminal 120 are formed as follows. First, a print pattern serving as the conductor layer of each of the positive electrode layer connection terminal 111, the positive electrode terminal 110, and the negative electrode terminal 120 is formed in the ceramic green sheet as the insulating base material 21 by printing/applying a metal paste containing a metal such as tungsten (W) as its major component. Then, the green sheets having the print patterns are fired, whereby the insulating base material 21 is formed so as to have the positive electrode layer connection terminal 111, the positive electrode terminal 110, and the negative electrode terminal 120 on its outer surfaces. The process of forming the positive electrode layer connection terminal 111, the positive electrode terminal 110, and the negative electrode terminal 120 is performed in the same process of forming the positive electrode connector 112 and the negative electrode connector 122. In order to obtain preferable wettability with a solder, a nickel (Ni) layer and a gold (Au) layer are preferably formed on the surfaces of the positive electrode terminal 110 and the negative electrode terminal 120 by plating or the like.

Furthermore, the housing member 20 includes the positive electrode layer connection terminal 111, the positive electrode connector 112, and the positive electrode terminal 110 as the conductors connected the positive electrode layer 11, and the metal lid member 22, the negative electrode connector 122, and the negative electrode terminal 120 as the conductors connected to the negative electrode layer 12. In addition, the negative electrode layer connection terminal 122 may be provided on the inner face of the metal lid member 22. Furthermore, the positive electrode layer 11 is arranged on a side of the insulating base material 21, but the negative electrode layer 12 may also be arranged.

Figure 2:
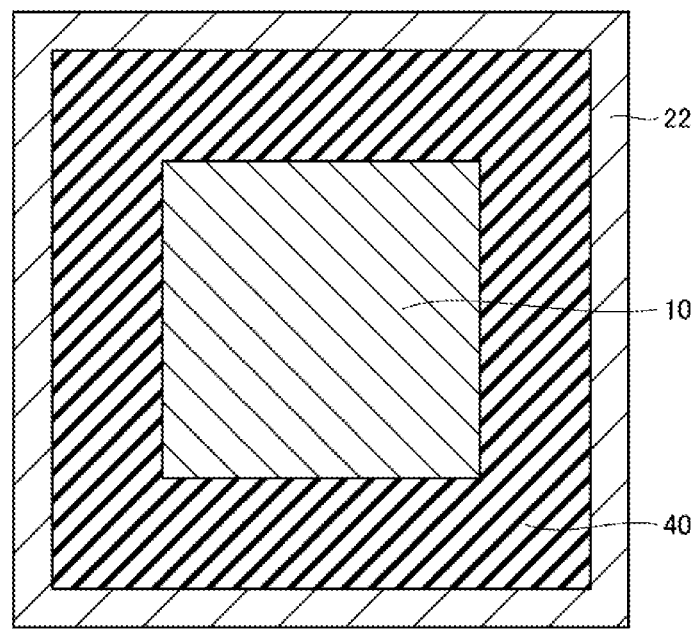
FIG. 2 is a horizontal cross-sectional view showing one example of an interposition member taken along a line II-II in FIG. 1.
Figure 4:
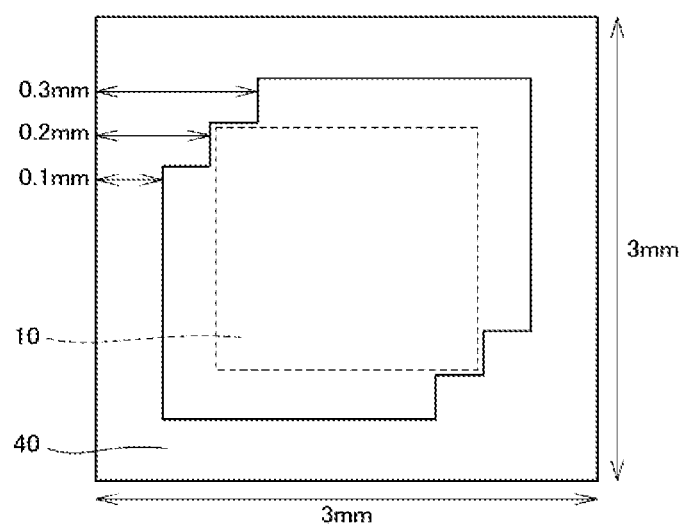
FIG. 4 is a plan view showing one example of an interposition member used in an example of the present invention.
Figure 7:
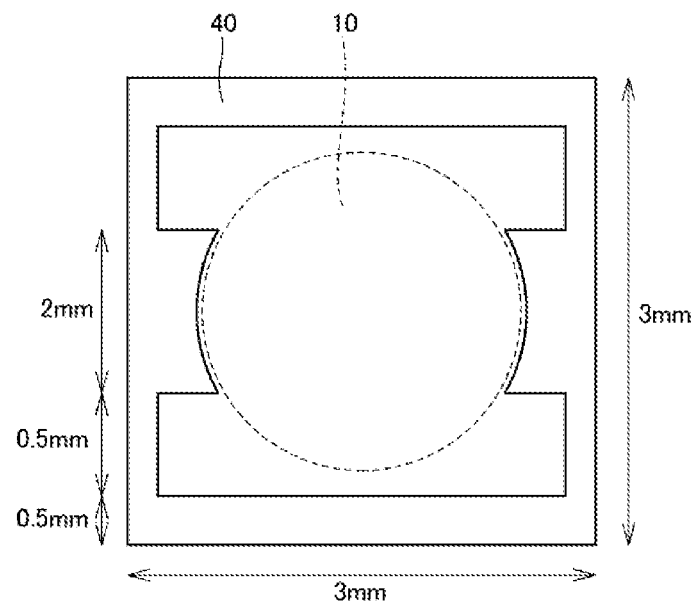
FIG. 7 is a plan view showing still another example of an interposition member used in an example of the present invention.

According to the battery housing structure 1 in the one embodiment of the present invention, as shown in FIGS. 1 and 2, an insulating interposition member 40 is provided between the battery body 10 and the metal lid member 22 serving as the one part of the housing member 20. The interposition member 40 is arranged so as to surround an outer periphery of the battery body 10, and composed of a ring-shaped member. Furthermore, the interposition member 40 is arranged so as to support or lock the outer periphery of the battery body 10, so that the outer periphery of the battery body 10 fits in the ring-shaped interposition member 40. In addition, the recessed part of the metal lid member 22 has a peripheral wall formed so as to surround the battery body 10, and the interposition member 40 is arranged between the peripheral wall and the battery body 10. The ring-shaped interposition member 40 may have planar shapes as shown in FIGS. 4 and 7.

According to the battery housing structure 1 in the present invention configured as described above, since the interposition member 40 is provided between the battery body 10 and the housing member 20, the battery body 10 can be prevented from being displaced in the housing member 20 even when a vibration, impact, or the like is applied to the battery housing structure 1. As a result, it is possible to assure a preferable electric connection between the electrode layers (the positive electrode layer 11 and the negative electrode layer 12) of the battery body 10 and the conductors (the metal lid member 22 and the positive electrode layer connection terminal 111) in the housing member 20, so that a connection defect or electric short circuit is not caused, and reliability can be enhanced.

In addition, according to the battery housing structure 1 in the present invention, the battery bodies 10 having various shapes and sizes can be positioned in the same housing member 20 by changing a shape or size of the interposition member 40, or by using a plurality of interposition members, or the like.

Furthermore, according to the battery housing structure 1 in the present invention, since the housing member 20 larger than the battery body 10 is used, the battery body 10 can be easily housed in the housing member 20. In addition, since air exists between the outer periphery of the battery body 10 and an inner periphery of the housing member 20, a heat insulting property can be maintained, so that a heat releasing property can be enhanced.

According to the battery housing structure 1 in the present invention, since the interposition member 40 is arranged so as to support or lock the outer periphery of the battery body 10, and the outer periphery of the battery body 10 fits in the ring-shaped interposition member 40, the battery body 10 can be fixedly positioned in the housing member 20.

Figure 3:
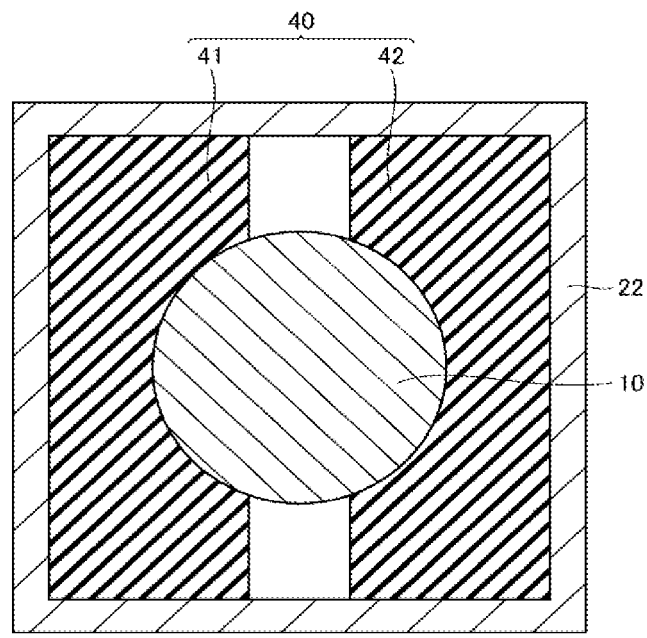
FIG. 3 is a horizontal cross-sectional view showing another example of an interposition member taken along a line III-III in FIG. 1.
Figure 5:
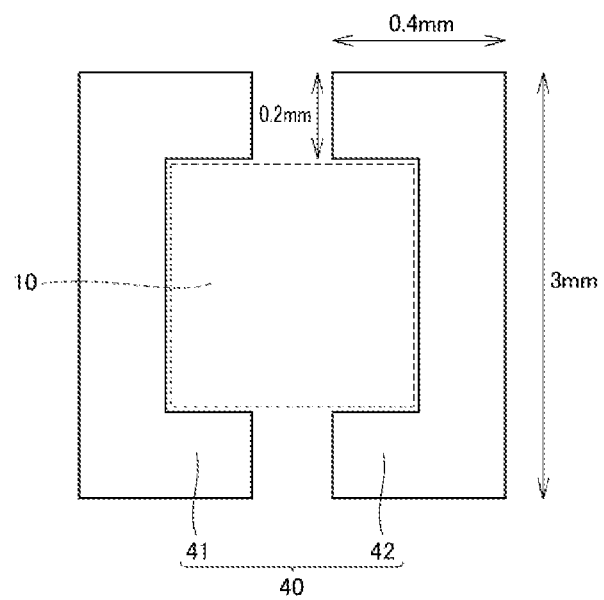
FIG. 5 is a plan view showing another example of an interposition member used in an example of the present invention.
Figure 6:
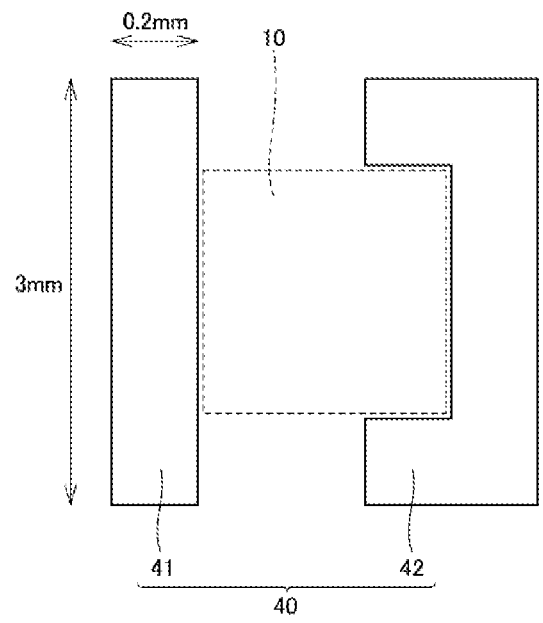
FIG. 6 is a plan view showing still another example of an interposition member used in an example of the present invention.
Figure 8:
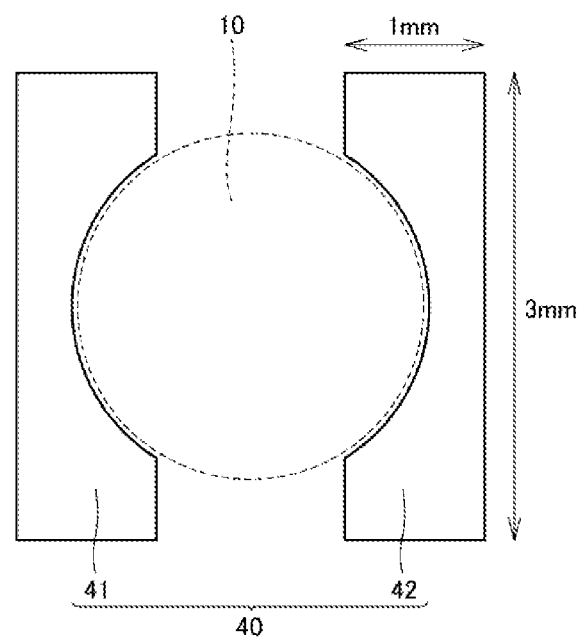
FIG. 8 is a plan view showing still another example of an interposition member used in an example of the present invention.

As shown in FIG. 3, the battery housing structure 1 in the present invention may house the column-shaped battery body 10, and two interposition members 41 and 42 may be provided between the battery body 10 and the metal lid member 22 serving as the one part of the housing member 20 so as to be opposed across the battery body 10. In this case, each of the interposition members 41 and 42 supports or locks one part of the outer periphery of the battery body 10, and the outer periphery of the battery body 10 partially fits in each of the interposition members 41 and 42. That is, the outer periphery of the battery body 10 partially has a cylindrical face serving as a projection part having a shape which fits in a curved face that forms a recessed part of each of the interposition members 41 and 42. The interposition members 41 and 42 may have planar shapes as shown in FIGS. 5 and 8, or only the one interposition member 42 may have the recessed part as shown in FIG. 6.

In addition, in terms of reliability of the battery, the battery body 10 is preferably positioned and fixed in the housing member 20 without any gap. In this case, it is preferable that the interposition members 40, 41, and 42 are tightly fitted without any loose area.

Meanwhile, in terms of production easiness of the battery, the battery body 10 is preferably loosely positioned and fixed in the housing member 20. In this case, a dimension of the recessed part of each of the interposition members 40, 41, and 42 is to be larger than a dimension of the projection part of the battery body 10, so that the battery body 10 can be easily arranged inside the interposition members 40, 41, and 42.

As shown in the battery housing structure 1 in the present invention, in the case where the battery body 10 is formed in such a manner that the positive electrode layer 11, the solid electrolyte layer 13, and the negative electrode layer 12 are sequentially laminated in the opposed direction of the insulating base material 21 and the metal lid member 22, the production easiness of the battery is to be prioritized, and it is preferable that the battery body 10 is loosely positioned and fixed in the housing member 20.

Furthermore, according to the battery housing structure 1 in the present invention, since the housing member 20 houses the battery body 10 which does not contain a liquid electrolyte but contains the solid electrolyte, it can resist the heating temperature in the reflow furnace. As a result, the battery housing structure 1 in the present invention can be mounted on a surface of a substrate by reflow soldering.

Furthermore, according to the battery housing structure 1 in the present invention, the positive electrode connector 112 and the negative electrode connector 122 are arranged inside the insulating base material 21, the positive electrode terminal 110 and the negative electrode terminal 120 are arranged on the lower face of the insulating base material 21, and the positive electrode layer 11 and the negative electrode layer 12 of the battery body 10 are connected to the positive electrode terminal 110 and the negative electrode terminal 120 through the positive electrode connector 112 and the negative electrode connector 122, respectively.

In this configuration, since the positive electrode terminal 110 and the negative electrode terminal 120 are arranged on the lower face which is the one outer surface of the insulating base material 21, the reflow soldering can be performed by supplying a soldering material paste in advance to positions on a wiring substrate which are to be connected to the positive electrode terminal 110 and the negative electrode terminal 120.

In this case, since the metalized layer is formed on the outer periphery surface of the insulating base material 21 which is bonded to the metal lid member 22, the insulating base material 21 and the metal lid member 22 are bonded through the metalized layer, and the negative electrode connector 122 arranged inside the insulating base material 21 is connected to the metalized layer, so that the metal lid member 22 is electrically connected to the negative electrode connector 122, the metal lid member 22 is electrically connected to the negative electrode layer 12 of the battery body 10 through the negative electrode connector 122, and thus, the metal lid member 22 serves as a conduction path.

In this configuration, the metal lid member 22 and the insulating base material 21 can be efficiently welded to each other by seam welding by applying a predetermined voltage to between the outer face of the metal lid member 22, and the negative electrode terminal 120 arranged on the outer surface of the insulating base material 21, and highly airtight bonding can be provided. As a result, deterioration due to moisture absorption of the battery body 10 can be prevented, for example.

Second Embodiment

Figure 9:
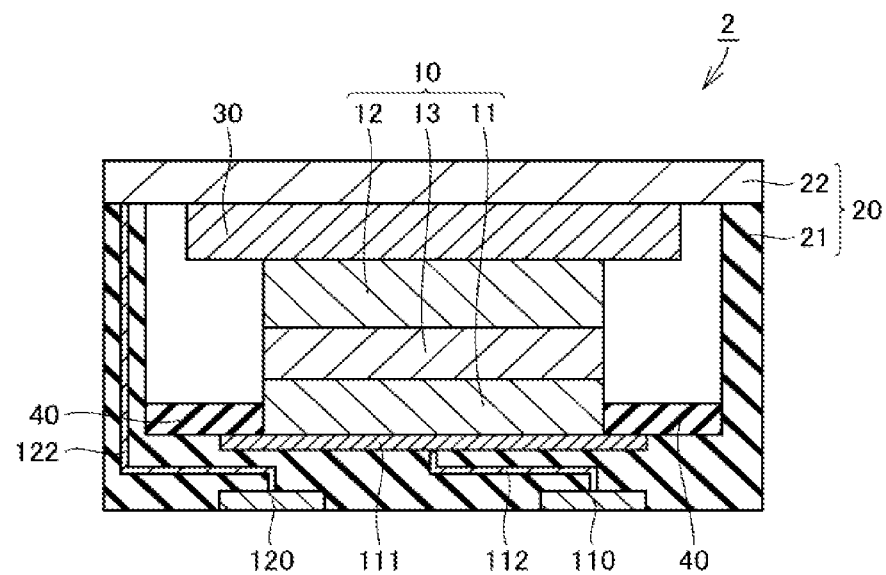
FIG. 9 is a vertical cross-sectional view showing a schematic cross-sectional surface of a battery housing structure as a second embodiment of the present invention.

As shown in FIG. 9, according to a surface mount type battery housing structure 2 in a second embodiment of the present invention, the insulating base material 21 has a recessed part for housing the battery body 10, and the metal lid member 22 has a plate shape. The interposition member 40 is provided between the battery body 10 and the insulating base material 21 serving as one part of the housing member 20. Another configuration of the battery housing structure 2 is the same as that of the battery housing structure 1 shown in FIG. 1. The battery housing structure 2 can also achieve the same advantageous effect as that of the battery housing structure 1.

Third Embodiment

Figure 10:
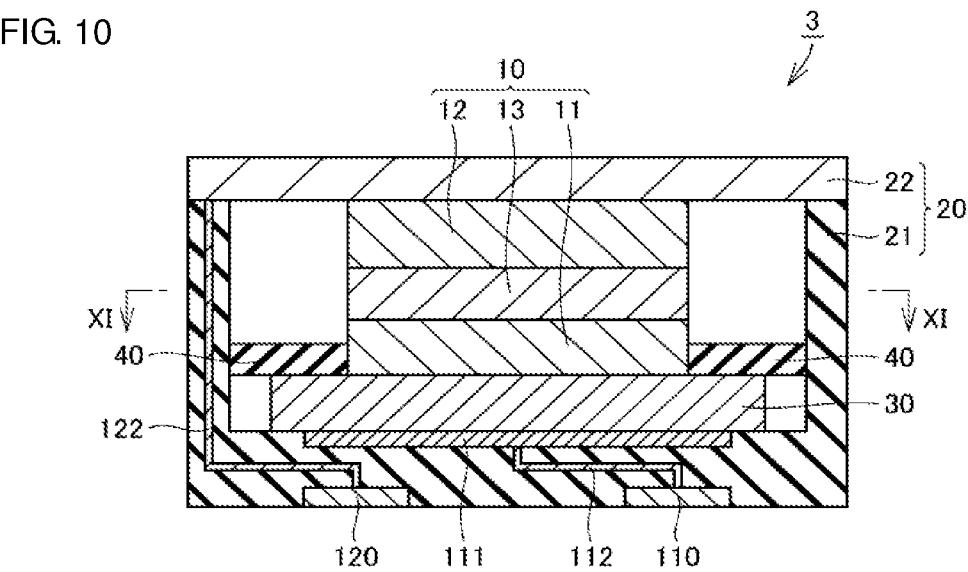
FIG. 10 is a vertical cross-sectional view showing a schematic cross-sectional surface of a battery housing structure as a third embodiment of the present invention.

As shown in FIG. 10, according to a surface mount type battery housing structure 3 in a third embodiment of the present invention, the conductive spacer 30 is arranged between the positive electrode layer 11 and the insulating base material 21, and the interposition member 40 is arranged on the conductive spacer 30. Another configuration of the battery housing structure 3 is the same as that of the battery housing structure 2 shown in FIG. 9. The battery housing structure 3 can also achieve the same advantageous effect as that of the battery housing structure 1.

Figure 11:
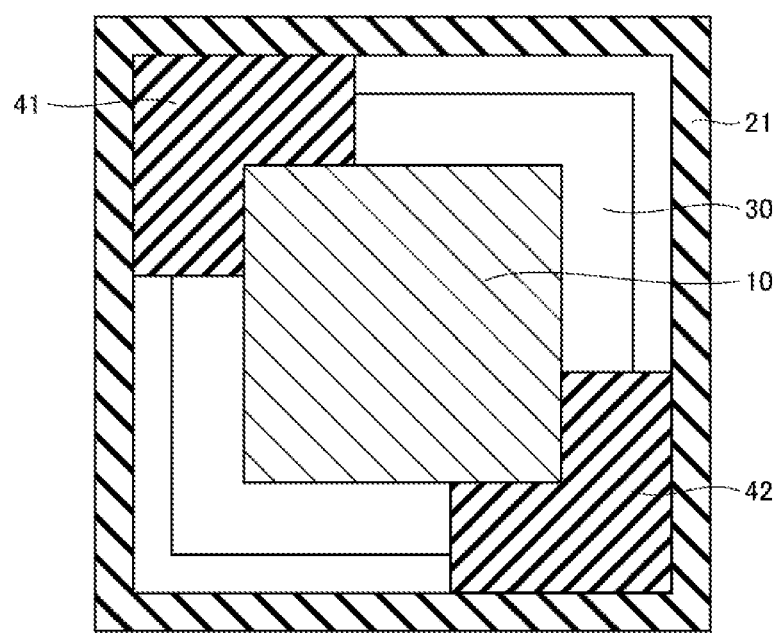
FIG. 11 is a horizontal cross-sectional view showing another example of an interposition member taken along a line XI-XI in FIG. 10.

As shown in FIG. 11, the battery housing structure in the present invention may house the cuboid-shaped battery body 10, and as the interposition member 40, the two L-shaped interposition members 41 and 42 may be provided between the battery body 10 and the insulating base material 21 serving as the one part of the housing member 20 so as to be opposed to each other across the battery body 10. In this case, each of the interposition members 41 and 42 supports or locks a corner serving as one part of the outer periphery of the battery body 10, and the one part of the outer periphery of the battery body 10 fits in each of the interposition members 41 and 42. That is, the one part of the outer periphery of the battery body 10 has a projecting outer corner having a shape which fits in a recessed inner corner of each of the interposition members 41 and 42.

Fourth Embodiment

Figure 12:
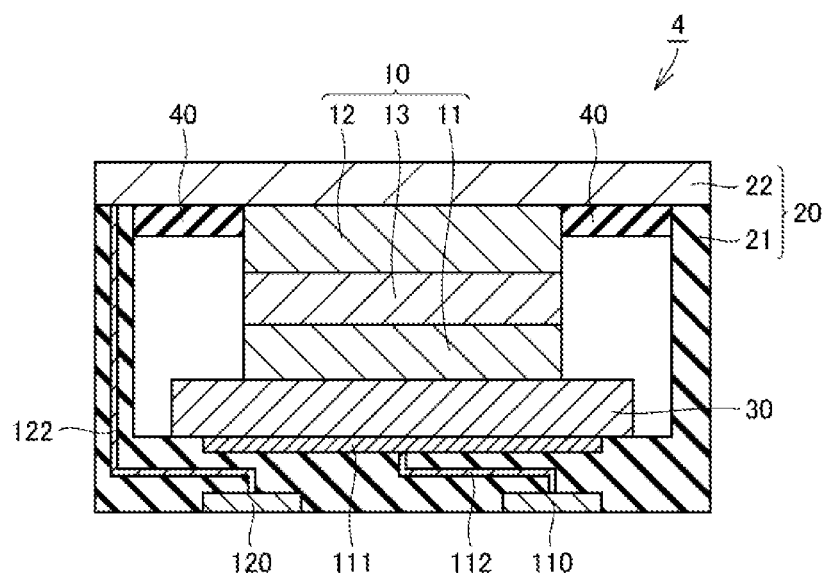
FIG. 12 is a vertical cross-sectional view showing a schematic cross-sectional surface of a battery housing structure as a fourth embodiment of the present invention.

According to the above embodiments, as shown in FIGS. 1, 9, and 10, the interposition member 40 is arranged on a side of the insulating base material 21, while according to a surface mount type battery housing structure 4 in a fourth embodiment of the present invention, as shown in FIG. 12, the interposition member 40 is arranged on a side of the metal lid member 22. In this case, the interposition member 40 may be fixed with a bonding resin applied to the metal lid member 22 serving as the one part of the housing member 20. Thus, displacement of the battery body 10 in the housing member 20 can be effectively prevented. In addition, another configuration of the battery housing structure 4 is the same as that of the battery housing structure 3 shown in FIG. 9. The battery housing structure 4 can also achieve the same advantageous effect as that of the battery housing structure 1.

Fifth Embodiment

Figure 13:
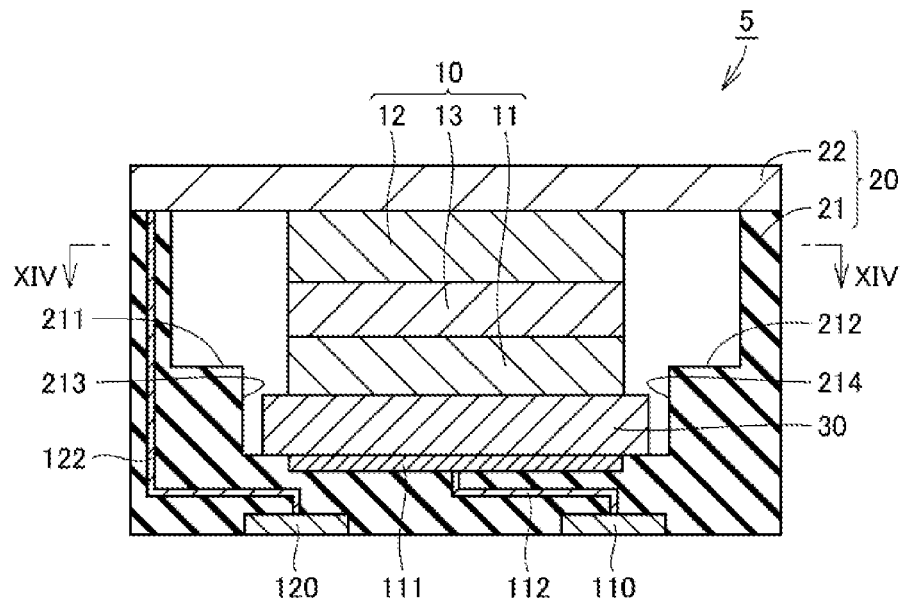
FIG. 13 is a vertical cross-sectional view showing a schematic cross-sectional surface of a battery housing structure as a fifth embodiment of the present invention.
Figure 14:
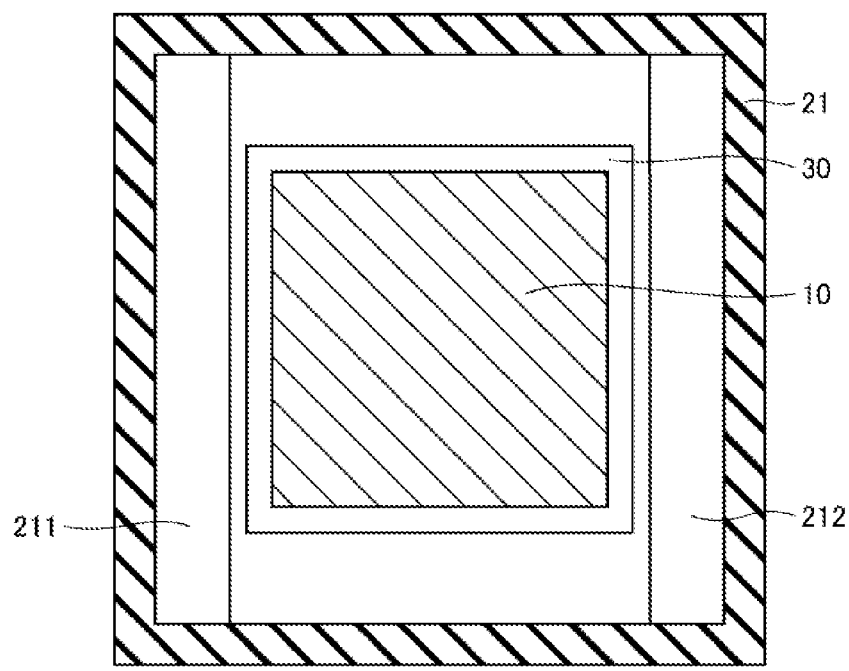
FIG. 14 is a horizontal cross-sectional view taken along a line XIV-XIV in FIG. 13.
Figure 15:
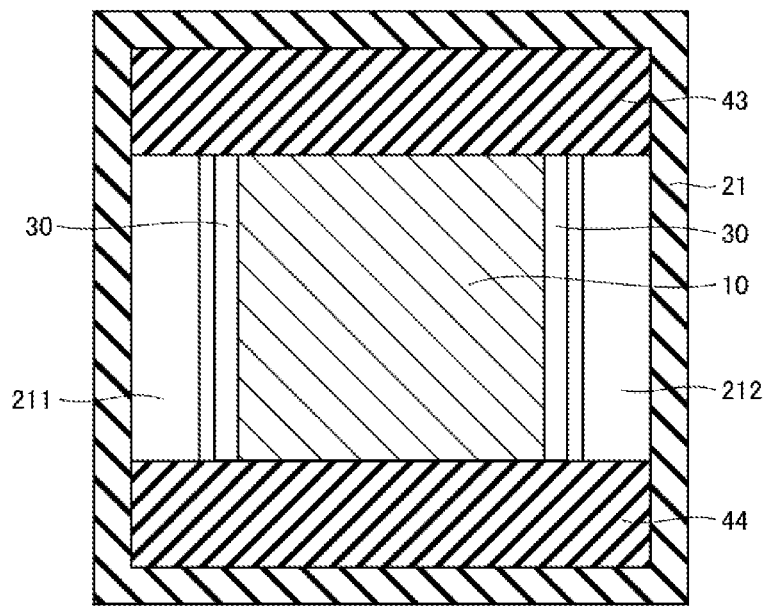
FIG. 15 is a horizontal cross-sectional view showing still another example of an interposition member taken along a line XIV-XIV in FIG. 13.

As shown in FIGS. 13 and 14, according to an assumed surface mount type battery housing structure 5 in a fifth embodiment of the present invention, stepped surfaces 211 and 212 are formed in an inner wall in a recessed part of the insulating base material 21, so that inner walls 213 and 214 are positioned further inside the recessed part of the insulating base material 21. Thus, as shown in FIG. 15, two rod-shaped interposition members 43 and 44 may be provided between the battery body 10 and the insulating base material 21 serving as the one part of the housing member 20 so as to be opposed to each other across the battery body 10 and serve as a bridge between the two stepped surfaces 211 and 212. In this case, the interposition members 43 and 44 sandwich the side surfaces serving as the one part of the outer periphery of the battery body 10 to support or lock them. Another configuration of the battery housing structure 5 is the same as that of the battery housing structure 3 shown in FIG. 10. The battery housing structure 5 can also achieve the same advantageous effect as that of the battery housing structure 1.

In addition, the configuration of the assumed surface mount type battery housing structure 5 shown in FIGS. 13 and 14 is used as a semiconductor device package such as micro electro mechanical systems (MEMS). Furthermore, the stepped surface may be also formed in a direction perpendicular to an extending direction of the stepped surfaces 211 and 212.

Furthermore, while the insulating interposition members 40, and 41 to 44 are provided in the battery housing structures 1 to 5, the conductive interposition members 40 and 41 to 44 may be provided. In the case where the insulating interposition member 40 is provided, a thickness of the interposition member 40 is not limited, but in the case where the conductive interposition member 40 is provided, the thickness of the interposition member 40 is limited in order to prevent electric short circuit caused between the positive electrode layer 11 and the negative electrode layer 12. For example, in the case where the conductive interposition member 40 is provided on a side of the positive electrode layer 11 in the battery housing structures 1 to 3 shown in FIGS. 1, 9, and 10, the thickness of the interposition member 40 needs to be smaller than a sum of thicknesses of the positive electrode layer 11 and the solid electrolyte layer 13. In the case where the conductive interposition member 40 is provided on a side of the negative electrode layer 12 in the battery housing structure 4 shown in FIG. 12, the thickness of the interposition member 40 needs to be smaller than a sum of thicknesses of the negative electrode layer 12 and the solid electrolyte layer 13.

According to the battery housing structures 1 to 5 in the above embodiments, the positive electrode layer 11 and the negative electrode layer 12 are laminated in the opposed direction of the insulating base material 21 and the metal lid member 22.

Sixth Embodiment

Figure 16:
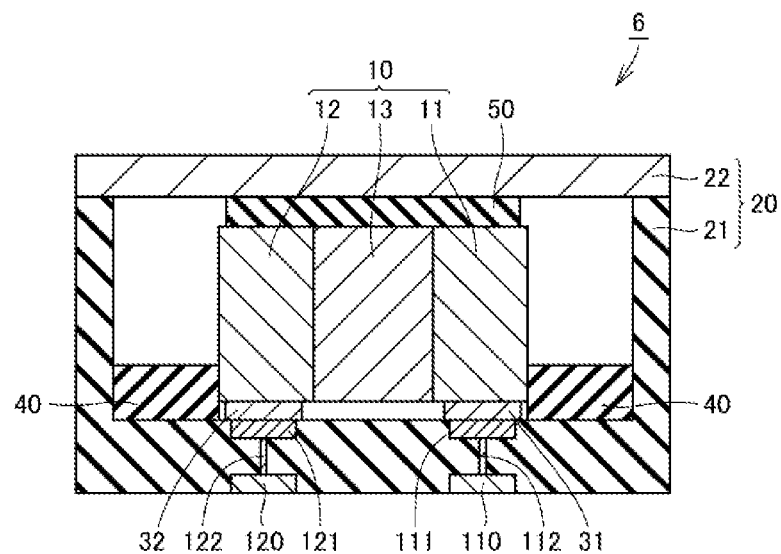
FIG. 16 is a vertical cross-sectional view showing a schematic cross-sectional surface of a battery housing structure as a sixth embodiment of the present invention.

As shown in FIG. 16, a surface mount type battery housing structure 6 in a sixth embodiment of the present invention is composed of the battery body 10 and the housing member 20 for housing the battery body 10. The housing member 20 is composed of the insulating base material 21 and the metal lid member 22. The insulating base material 21 has the surface on which the battery body 10 is placed. The metal lid member 22 is bonded to the insulating base material 21 so as to cover the battery body 10 placed on the surface of the insulating base material 21. The insulating base material 21 has the recessed part for housing the battery body 10, and the metal lid member 22 has the plate shape. The battery body 10 is formed in such a manner that the positive electrode layer 11, the solid electrolyte layer 13, and the negative electrode layer 12 are sequentially laminated in the extending direction of the insulating base material 21. The insulating spacer 50 is arranged between the outer peripheral face of the battery body 10 and the inner face of the metal lid member 22 serving as the one part of the housing member 20.

The insulating interposition member 40 is provided between the battery body 10 and the insulating base material 21 serving as the one part of the housing member 20. The interposition member 40 is arranged so as to surround the outer periphery of the battery body 10, and composed of the ring-shaped member. Furthermore, the interposition member 40 is arranged so as to support or lock the outer periphery of the battery body 10, and the outer periphery of the battery body 10 fits in the ring-shape interposition member 40. In addition, the recessed part of the insulating base material 21 has the peripheral wall formed so as to surround the battery body 10, and the interposition member 40 is arranged between the peripheral wall and the battery body 10. The ring-shaped interposition member 40 may have the planar shapes shown in FIGS. 2, 4, and 7. The ring-shaped interposition member 40 has the insulating property.

The two interposition members 41 and 42 having the planar shapes shown in FIGS. 5 and 11 may be provided, for example, between the battery body 10 and the insulating base material 21 serving as the one part of the housing member 20 so as to be opposed to each other across the battery body 10. In this case, each of the interposition members 41 and 42 supports or locks the one part of the outer periphery of the battery body 10, and the one part of the outer periphery of the battery body 10 fits in each of the interposition members 41 and 42. That is, the one part of the outer periphery of the battery body 10 has the projection part having the shape fitting in the recessed part of each of the interposition members 41 and 42. As shown in FIG. 6, only the one interposition member 42 may have the recessed part. The two interposition members 41 and 42 may have the insulating property or may have the conductive property.

The insulating base material 21 has the positive electrode connector 112 and the negative electrode connector 122 serving as the electrode connectors to connect the inner face to the outer face of the insulating base material 21. The positive electrode layer connection terminal 111 and the negative electrode layer connection terminal 121 are formed in the inner face of the insulating base material 21. The conductive spacer 31 is arranged between the positive electrode layer 11 and the positive electrode layer connection terminal 111, and the conductive spacer 32 is arranged between the negative electrode layer 12 and the negative electrode layer connection terminal 121. The battery body 10 is arranged on a bottom face of the recessed part of the insulating base material 21 so that the positive electrode layer connection terminal 111 is connected to the positive electrode layer 11 through the conductive spacer 31, and the negative electrode layer connection terminal 121 is connected to the negative electrode layer 12 through the conductive spacer 32. The positive electrode layer 11 is connected to the positive electrode terminal 110 through the conductive spacer 31, the positive electrode layer connection terminal 111, and the positive electrode connector 112. The negative electrode layer 12 is connected to the negative electrode terminal 120 through the conductive spacer 32, the negative electrode layer connection terminal 121, and the negative electrode connector 122.

Another configuration of the battery housing structure 6 is the same as that of the battery housing structure 1 shown in FIG. 1. The battery housing structure 6 can also achieve the same advantageous effect as that of the battery housing structure 1.

Seventh Embodiment

Figure 17:
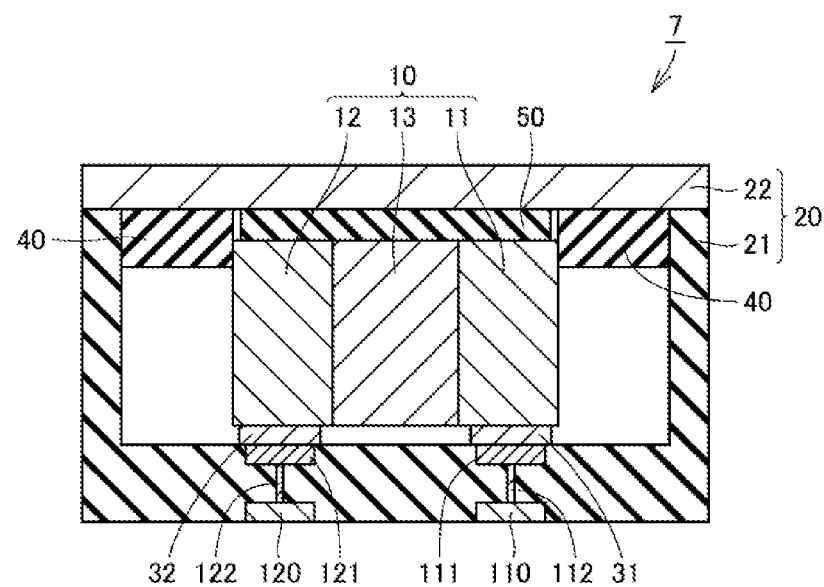
FIG. 17 is a vertical cross-sectional view showing a schematic cross-sectional surface of a battery housing structure as a seventh embodiment of the present invention.

The interposition member 40 is arranged on a side of the insulating base material 21 as shown in FIG. 16 in the above embodiment, but the interposition member 40 may be arranged on a side of the metal lid member 22 as shown in a surface mount type battery housing structure 7 in a seventh embodiment of the present invention in FIG. 17. In this case, the interposition member 40 may be fixed with a bonding resin applied to the metal lid member 22 serving as the one part of the housing member 20. Thus, the displacement of the battery body 10 in the housing member 20 can be effectively prevented. Furthermore, another configuration of the battery housing structure 7 is the same as that of the battery housing structure 6 shown in FIG. 16. The battery housing structure 7 can also achieve the same advantageous effect as that of the battery housing structure 1.

Eighth Embodiment

Figure 18:
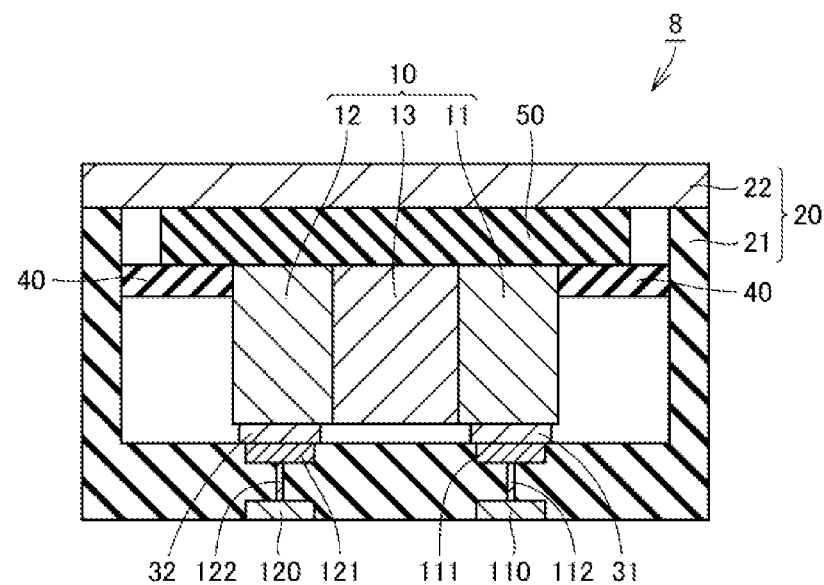
FIG. 18 is a vertical cross-sectional view showing a schematic cross-sectional surface of a battery housing structure as an eighth embodiment of the present invention.

As show in FIG. 18, according to a surface mount type battery housing structure 8 in an eighth embodiment in the present invention, the interposition member 40 is arranged on a side of the metal lid member 22, while the insulating spacer 50 is arranged between the interposition member 40 and the metal lid member 22. In this case, the insulating spacer 50 is longer than the laminated body of the positive electrode layer 11, the solid electrolyte layer 13, and the negative electrode layer 12 laminated along the extending direction of the insulating base material 21, and the inter- position member 40 may be fixed with a bonding resin applied to the insulating spacer 50. Thus, the displacement of the battery body 10 in the housing member 20 can be effectively prevented. Another configuration of the battery housing structure 8 is the same as the of the battery housing structure 6 shown in FIG. 16. The battery housing structure 8 can also achieve the same advantageous effect as that of the battery housing structure 1.

In addition, in a case where each of the conductive spacers 30, 31, and 32 contains carbon or a carbon sheet in the battery housing structures 1 to 8 in the present invention, battery performance can be prevented from deteriorating because even when each of the conductive spacers 30, 31, and 32 serving as a buffer material is interposed between at least one of the positive electrode layer 11 and the negative electrode layer 12, and the housing member 20, the carbon or the carbon sheet does not react with the electrode material or the like.

In addition, in the battery housing structures 1 to 8 in the present invention, the conductive spacers 30, 31, and 32 are not always indispensable components. When the conductive spacers 30, 31, and 32 are provided, the electric connection can be preferably assured between the battery body 10 and the metal lid member 22 serving as the one part of the housing member 20, or the conductor in the insulating base material 21, so that reliability can be further improve.

Furthermore, in the case where the battery body 10 is formed such that the positive electrode layer 11, the solid electrolyte layer 13, and the negative electrode layer 12 are sequentially laminated in the extending direction of the insulating base material 21 as in the battery housing structures 6 to 8 in the present invention, the reliability of the battery is to be prioritized and the battery body 10 is preferably positioned and fixed in the housing member 20 without any space. In addition, in the case where the conductive spacer is arranged between the battery body 10 and the metal lid member 22, it is to be noted that the conductive spacer is to be arranged so as not to cover both of the positive electrode layer 11 and the negative electrode layer 12.

According to the above embodiments, $Li_2FeS_2$ or $LiCoO_2$ is used as the positive electrode active material, $Li_2S-P_2S_5$ series composition or $Li_3PS_4$ is used as the solid electrolyte, and graphite is used as the negative electrode active material, but following materials may be used.

The positive electrode active material may include a lithium-containing phosphate compound having a nasicon type structure such as $Li_3V_2(PO_4)_3$, a lithium-containing phosphate compound having an olivine type structure such as $LiFePO_4$ or $LiMnPO_4$, a layered compound such as $LiCoO_2$, $LiCo_{1/3}Ni_{1/3}Mn_{1/3}O_2$, and a lithium-containing compound having a spinel type structures such as $LiMn_2O_4$, $LiNi_{0.5}Mn_{1.5}O_4$, or $Li_4Ti_5O_{12}$.

The negative electrode active material may include a compound having a composition expressed by MOx (M contains at least one kind element selected from the group consisting of Ti, Si, Sn, Cr, Fe, and Mo, and x is a numeric value within a range of $0.9 \le x \le 2.0$). In addition, it may be a mixture of two or more active materials each having a composition expressed by MOx in which M is a different element such as $TiO_2$ or $SiO_2$. Furthermore, the negative electrode active material may be a graphite-lithium compound, a lithium alloy such as Li—Al, and an oxide such as $Li_3V_2(PO_4)_3$, $Li_3Fe_2(PO_4)_3$, or $Li_4Ti_5O_{12}$.

The solid electrolyte may include a lithium-containing phosphate compound having a nasicon type structure. The lithium-containing phosphate compound having the nasicon type structure is expressed by a chemical formula of $Li_xM_y(PO_4)_3$ (x and y are numerical values within a range of $1 \leq x \leq 2$, and $1 \leq y \leq 2$, and M contains at least one kind element selected from the group consisting of Ti, Ge, Al, Ga, and Zr, in the chemical formula). In this case, one part of P in the chemical formula may be replaced with B, or Si. In addition, it may be a mixture of two or more lithium-containing phosphate compounds having the nasicon type structure having different compositions such as $Li_{1.5}Al_{0.5}Ge_{1.5}(PO_4)_3$ and $Li_{1.2}Al_{0.2}Ti_{1.8}(PO_4)_3$.

Furthermore, the lithium-containing phosphate compound having the nasicon type structure used for the solid electrolyte may include a compound containing a crystal phase of lithium-containing phosphate compound having the nasicon type structure, or glass which precipitates the crystal phase of the lithium-containing phosphate compound having the nasicon type structure through a heat treatment.

Furthermore, the material used for the solid electrolyte can be a material having ion conductivity and having electron conductivity which is vanishingly small, other than the lithium-containing phosphate compound having the nasicon type structure. Such material may include lithium halide, lithium nitride, lithium oxoate, and derivatives of those. Furthermore, it may include a Li—P—O series compound such as lithium phosphate ($Li_3PO_4$), LiPON ($LiPO_{4-x}N_x$) in which nitrogen is mixed in lithium phosphate, a Li—Si—O series compound such as $Li_4SiO_4$, a Li—P—Si—O series compound, a Li—V—Si—O series compound, a compound having a perovskite structure such as $La_{0.51}Li_{0.35}TiO_{2.94}$, $La_{0.55}Li_{0.35}TiO_3$, or $Li_{3x}La_{2/3-x}TiO_3$, and a compound having a garnet type structure containing Li, La, and Zr Next, a description will be given on examples of the battery housing structures in the present invention produced according to the above embodiments. In addition, it is to be noted that the configuration of the battery housing structure in the present invention is not limited to the above embodiments.

EXAMPLE

Hereinafter, examples 1 to 7 produced as the battery housing structures in the present invention will be described.

Example 1

The battery body 10 shown in FIG. 1 was produced with $Li_2FeS_2$ as the positive electrode active material, and graphite as the negative electrode active material, and $Li_2S$—$P_2S_5$ series compound as the solid electrolyte.

The positive electrode material was produced by mixing $Li_2FeS_2$ and $Li_2S$—$P_2S_5$ series compound at a mass ratio of 1:1. The negative electrode material was produced by mixing graphite and $Li_2S$—$P_2S_5$ series compound at a mass ratio of 1:1.

The positive electrode material, the solid electrolyte, and the negative electrode material produced as described above were sequentially laminated, and pressed at a pressure of 3000 kgf/cm$^2$, whereby a pellet having a three-layer structure was produced. Thus, as shown in FIG. 1, the battery body 10 having the solid electrolyte layer 13 sandwiched between the positive electrode layer 11 and the negative electrode layer 12 was provided. The provided battery body 10 had a cuboid shape of 2.55 mm×2.55 mm×0.7 mm.

Meanwhile, a metal paste containing a metal of tungsten (W) as its major component was printed/applied to an alumina compact as the ceramic green sheet composing the insulating base material 21 shown in FIG. 1, whereby the print pattern as the conductor or the terminal was formed. Then, the green sheets each having the print pattern were laminated and fired to produce the insulating base material 21 internally having the positive electrode connector 112 and the negative electrode connector 122 as the conductors, and the positive electrode layer connection terminal 111, and having the positive electrode terminal 110 and the negative electrode terminal 120 in its outer surfaces. At this time, the metalized layer was formed on the peripheral surface of the insulating base material 21. In order to improve wettability with the solder, a nickel (Ni) layer and a gold (Au) layer were formed on the surfaces of the positive electrode terminal 110 and the negative electrode terminal 120 by plating.

As the interposition member 40 shown in FIG. 1, a ring-shaped interposition member was used in which a square-shaped hole of 2.6 mm×2.6 mm was formed in a center of a polyimide film having a square shape of 3 mm×3 mm in planar view and having a thickness of 125 μm, as shown in FIG. 2. As a material of the interposition member 40, a polytetrafluoroethylene film may be used. With the insulating base material 21 and the interposition member 40 provided in the above, the interposition member 40 was arranged on the surface of the insulating base material 21 in such a manner that the surface of the positive electrode layer connection terminal 111 in the insulating base material 21 can be seen through the rectangular hole of the interposition member 40. Then, the battery body 10 provided as described above was placed on the surface of the insulating base material 21 with the positive electrode layer 11 of the battery body 10 facing downward so that the positive electrode layer 11 of the battery body 10 abutted on the positive electrode layer connection terminal 111 in the insulating base material 21. Thus, the interposition member 40 was arranged so as to surround the outer periphery of the battery body 10.

Furthermore, the conductive spacer 30 was arranged on the negative electrode layer 12 of the battery body 10. As the conductive spacer 30, a carbon sheet having a square shape of 2.8 mm×2.8 mm in planar view and having a thickness of 70 μm was used.

Then, the metallize layer was formed on the outer peripheral surface of the insulating base material 21, and the metal lid member 22 composed of iron-nickel-covert alloy was arranged so as to cover the battery body 10 placed on the surface of the insulating base material 21. Thus, the metal lid member 22 and the insulating base material 21 were bonded by seam welding by applying a predetermined voltage between the outer surface of the metal lid member 22 and the negative electrode terminal 120 arranged on the outer surface of the insulating base material 21. Thus, the surface mount type battery housing structure 1 having the rectangular shape of 5 mm×5 mm in planar view was produced.

Example 2

The surface mount type battery housing structure 1 was produced similarly to the example 1 except that the ring-shaped interposition member 40 having the planar shape shown in FIG. 4 was used.

Example 3

The surface mount type battery housing structure 1 was produced similarly to the example 1 except that the interposition member 40 was composed of the two interposition members 41 and 42 having the planar shape shown in FIG. 5.

Example 4

The surface mount type battery housing structure 1 was produced similarly to the example 1 except that the interposition member 40 was composed of the two interposition members 41 and 42 having the planar shape shown in FIG. 6.

Example 5

The surface mount type battery housing structure 1 was produced similarly to the example 1 except that the shape of the battery body 10 was changed to a column shape having a diameter of 2.55 mm, and a height of 0.7 mm, and the hole formed in the center of the interposition member 40 was changed to a circular shape having a diameter of 2.6 mm.

Example 6

The surface mount type battery housing structure 1 was produced similarly to the example 5 except that the hole formed in the center of the interposition member 40 was changed as shown in FIG. 7.

Example 7

The surface mount type battery housing structure 1 was produced similarly to the example 5 except that the interposition member 40 was composed of the two interposition members 41 and 42 having a planar shape shown in FIG. 8.

In addition, as for the interposition members 40, 41, and 42 shown in FIGS. 4 to 8, a shape of a fine part is exaggerated, so that a dimension of each part does not coincident with an actual dimension rate.

A free-fall drop test was performed for the battery housing structures 1 produced in the examples 1 to 7, and for the battery housing structure 500 (in FIG. 19) which is not provided with the interposition member. The battery housing structure freely fell from a height of 75 cm to a concrete surface. The position of the battery body 10 in the housing member 20 was examined with transmission X-ray before and after the free-fall drop test, as a non-destructive test. While the position of the battery body 10 was displaced in the battery housing structure 500 not having the interposition member, the position of the battery body 10 and the conductive spacer 30 were not displaced in the battery housing structure 1 having the interposition member 40. In addition, while the some battery body 10 was not able to be charged/discharged in the battery housing structure 500 not having the interposition member after the free-fall drop test, each battery body 10 in the battery housing structure 1 having the interposition member 40 was able to be charged/discharged, and capacity of 0.2 mAh was obtained. From the above, it is found that the battery housing structure 1 can be produced with high reliability because of the interposition member 40.

It is to be considered that the embodiments and examples disclosed in the above are illustrative and not restrictive in every respect. It is intended that the scope of the present invention is shown not by the above embodiments and the examples but by claims, and includes all modifications and variations within the meaning and the range equivalent to those of claims.

It is possible to provide a mount type battery housing structure capable of preferably assuring an electric connection between an electrode layer of a battery body and a conductor of a housing member, and housing the battery body of a solid battery with high reliability.

REFERENCE SIGNS

1, 2, 3, 4, 5, 6, 7, 8: Battery housing structure, 10: Battery body, 11: Positive electrode layer, 12: Negative electrode layer, 13: Solid electrolyte layer, 20: Housing member, 21: Insulating base material, 22: Metal lid member, 30, 31, 32: Conductive spacer, 40, 41, 42, 43, 44: Interposition member, 50: Insulating spacer, 110: Positive electrode terminal, 111: Positive electrode layer connection terminal, 112: Positive electrode connector, 120: Negative electrode terminal, 121: Negative electrode layer connection terminal, 122: Negative electrode connector

The invention claimed is:

1. A battery housing structure comprising:
a battery body including a positive electrode layer, a solid electrolyte layer, and a negative electrode layer;
a housing member housing the battery body, the housing member including conductors connected to the positive electrode layer and the negative electrode layer, respectively; and
a conductive interposition member directly fixed to the housing member and interposed between the battery body and the housing member so as to abut at least a portion of an outer periphery of the battery body and fixedly position the battery body relative to the housing member, wherein (1) when the conductive interposition member is disposed on a side of the positive electrode layer of the battery housing structure, the conductive interposition member has a first thickness smaller than that of a sum of thicknesses of the positive electrode layer and the solid electrolyte layer, and (2) when the conductive interposition member is disposed on a side of the negative electrode layer of the battery housing structure, the conductive interposition member has a second thickness smaller than that of a sum of thicknesses of the negative electrode layer and the solid electrolyte layer.

2. The battery housing structure according to claim 1, wherein the conductive interposition member is arranged so as to surround an outer periphery of the battery body.

3. The battery housing structure according to claim 2, wherein the conductive interposition member comprises a ring-shaped member surrounding the outer periphery of the battery body.

4. The battery housing structure according to claim 1, wherein the conductive interposition member comprises a plurality of members that oppose each other across the battery body.

5. The battery housing structure according to claim 1, wherein the conductive interposition member comprises a part supporting at least one part of the outer periphery of the battery body.

6. The battery housing structure according to claim 5, wherein the conductive interposition member has a recessed part, and the outer periphery of the battery body has a projection part having a shape fitting in the recessed part.

7. The battery housing structure according to claim 1, wherein the housing member comprises an insulating base material having a surface for supporting the battery body, and a lid member bonded to the insulating base material so as to cover the battery body on the surface of the insulating base material.

8. The battery housing structure according to claim 7, further comprising a conductive spacer arranged between the lid member and at least one of the positive electrode layer and the negative electrode layer.

9. The battery housing structure according to claim 7, further comprising a conductive spacer arranged between the insulating base material and at least one of the positive electrode layer and the negative electrode layer.

10. The battery housing structure according to claim 7, further comprising an insulating spacer arranged between the battery body and the lid member.

11. The battery housing structure according to claim 10, wherein the conductive interposition member is fixed to the insulating spacer.

12. The battery housing structure according to claim 7, wherein the conductive interposition member is fixed to the lid member.

13. The battery housing structure according to claim 7, wherein at least one of the insulating base material and the lid member has a recessed part housing at least one part of the battery body.

14. The battery housing structure according to claim 13, wherein the battery body has an outer surface, and the recessed part of at least one of the insulating base material and the lid member has a peripheral wall that surrounds at least one part of the outer surface of the battery body.

15. The battery housing structure according to claim 14, wherein the conductive interposition member is arranged between the peripheral wall and the battery body.

16. The battery housing structure according to claim 7, wherein the positive electrode layer and the negative electrode layer are laminated in an opposed direction of the insulating base material and the lid member.

17. The battery housing structure according to claim 7, wherein the positive electrode layer and the negative electrode layer are laminated in an extending direction of the insulating base material.

* * * * *